United States Patent [19]

Bradley et al.

[11] Patent Number: 5,283,130
[45] Date of Patent: Feb. 1, 1994

[54] THERMOMAGNETICALLY PATTERNED MAGNETS AND METHOD OF MAKING SAME

[75] Inventors: John R. Bradley, Centerline; Thomas A. Perry, Washington; Thaddeus Schroeder, Rochester Hills, all of Mich.

[73] Assignee: General Motors Corporation, Detroit, Mich.

[21] Appl. No.: 788,662

[22] Filed: Nov. 6, 1991

Related U.S. Application Data

[62] Division of Ser. No. 589,352, Sep. 28, 1990, Pat. No. 5,089,060.

[51] Int. Cl.$^5$ ............................................... H01F 1/00
[52] U.S. Cl. ................................... 428/611; 428/928; 335/302; 310/154; 310/156; 148/103
[58] Field of Search ............... 428/928, 611; 335/302, 335/303; 310/154, 156; 148/101, 103

[56] References Cited

U.S. PATENT DOCUMENTS

| 4,312,684 | 1/1982 | Chraplyvy et al. | 148/121 |
| 4,347,086 | 8/1982 | Chraplyvy et al. | 148/101 |

OTHER PUBLICATIONS

A Dictionary of Metallurgy, A D. Merriman 1958 p. 236.
Hansen, "Magneto-Optical Recording Materials and Technologies", *Journal of Magnetism and Magnetic Materials*, vol. 83 (1990), pp. 6-12.
Herbst et al, "Laser Annealing and Selective Magnetization of Manganese-Aluminum Alloys", *Appl. Phys. Lett.*, vol. 37, No. 8, Oct. 15 1980, pp. 753-754.
Kryder, "Advanced in Magneto-Optic Recording Technology", *Journal of Magnetism and Magnetic Materials*, vol. 83 (1990), pp. 1-5.
Lunney et al, "Enhanced Corrosion Resistance of $Fe_{40}Ni_{38}Mo_4B_{18}$ and $Nd_{15}Fe_{77}B_8$ by Laser Glazing", *SPIE*, vol. 1023 Excimer Lasers and Applications (1988), pp. 216-223.
Weller-Brophy et al, "Materials Challenges in Integrated Optical Recording Heads", *MRS Bulletin*, vol. XV, No. 4, Apr. 1990, pp. 25-30.
Ara et al, "Formation of Magnetic Grating on Steel Plates by Electron/Laser Beam Irradiation", *IEEE Transactions on Magnetics*, vol. 25, No. 5, Sep. 1989, pp. 3830-3832.
Bradley et al, "Microstructure and Magnetic Properties of $CO_2$ Laser Surface Melted Nd-Fe-B Magnets", *Journal of Magnetism and Magnetic Materials*, vol. 86 (1990), pp. 44-50.
Croat et al, "Crystallization of Amorphous $Pr_{0.27}Co_{0.73}$: Magnetic Properties and Laser-Induced Coercivity", *Appl. Phys. Lett.*, vol. 37, No. 10, Nov. 15, 1980, pp. 962-964.
Gambino (editor), "Optical Storage Disk Technology", *MRS Bulletin*, vol. XV, No. 4, Apr. 1990, pp. 20-22.
Greidanus et al, "Magneto-Optical Storage Materials", *MRS Bulletin*, vol. XV, No. 4, Apr. 1990, pp. 31-39.

*Primary Examiner*—John P. Sheehan
*Attorney, Agent, or Firm*—George A. Grove

[57] ABSTRACT

A permanent magnet is heated in a pattern by a laser beam to a localized temperature above the Curie point or a temperature sufficient to reduce the magnet coercivity sufficiently for the field of the magnet or an external field to remagnetize the pattern in the reverse direction. Magnets so produced can have very high pole density, digital encoding and analog patterns having gradually varying local field strength.

6 Claims, 2 Drawing Sheets

THERMOMAGNETICALLY PATTERNED MAGNETS AND METHOD OF MAKING SAME

This is a division of application Ser. No. 07/589,352 filed on Sep. 28, 1990, now U.S. Pat. No. 5,089,060.

FIELD OF THE INVENTION

This invention relates to patterned magnets and a thermomagnetic method of making such magnets and particularly where the microstructure of the material is not affected by the magnetic coding process.

BACKGROUND OF THE INVENTION

In automotive and other industrial applications, special sensors are used to determine shaft speed and angular position, for example, as well as linear motion sensing. Generally, such sensors are of the variable reluctance variety and comprise a toothed wheel spaced from a sensor comprising a magnet and a magnetoresistor or a Hall effect device. Other types of sensors require multi-bit digital encoding for position sensing and other uses.

A permanent magnet with an appropriate magnetization pattern can serve as the exciter component of a magnetoresistive sensor without the need for a separate bias magnet. However, by conventional production methods currently in use, very small magnet exciters could not be magnetized with a pattern providing the necessary resolution, and the cost of a large permanent magnet exciter would be prohibitive. If several different magnetization patterns are desired side by side, such as for multi-bit digital encoding, more complex manufacturing problems arise; either machining or magnetizing such an exciter as one unit is very costly and is seldom done.

It has been proposed in U.S. Pat. No. 4,312,684 to Chraplyvy et al entitled "Selective Magnetization of Manganese-Aluminum Alloys" and in U.S. Pat. No. 4,347,086 to Chraplyvy et al entitled "Selective Magnetization of Rare-Earth Transitional Metal Alloys", both assigned to the assignee of the present invention, to create local regions of hard magnetic material in a substrate of a special non-magnetic or soft magnetic material by exposing selected regions of the substrate to a laser beam for heating such regions to a transformation temperature at which magnetic material is formed. The magnetic regions are magnetized in a strong field to produce a permanent magnetic code having sufficient flux density to be readable with a magnetic sensor such as a magnetic tape head. The materials used are expensive and the magnetic fields produced are too weak for sensing by non-contact sensors at a distance greater than about 380 $\mu$m.

In addition, the paper of Ara et al, "Formation of Magnetic Grating on Steel Plates by Electron/Laser Beam Irradiation", IEEE Trans. Magnetics, Vol. 25, No. 5 (1989), p. 3830, discloses an attempt to make a magnetic sensor by forming magnetic gratings on non-magnetic austenitic stainless steel by laser beam heating of strips on the plate to a temperature sufficient to effect transformation of the heated regions to produce small grains of the ferromagnetic phase in the austenitic phase, and similarly heating a ferromagnetic carbon steel having a ferrite/pearlite phase which was changed to martensite by beam irradiation. The gratings were magnetized and the magnetic flux from each track was detected by a sensor passed over the grating. The signal produced was far too weak to be useful in many applications.

It has also been proposed to alter the magnetic properties of very thin films of special materials for data storage by a thermomagnetic method. In the recording of a magneto-optical disc, a thin layer (about 1 $\mu$m thick) of an amorphous transition metal-rare earth alloy is coated on a disc and the entire disc is magnetized in a given direction. A laser is then used to locally heat the surface (typically, a 1.6 $\mu$m diameter spot) in a static applied magnetic field to reverse the direction of the disc's magnetization in the heated region. Because the magnetic regions are so small and magnetically weak, a magnetic sensor such as a magnetoresistor or a Hall effect device cannot respond to the individual bits of data. The data is read optically using the Kerr effect. This requires a beam-splitter, two detectors, two linear polarizers, a half-wave plate, and beam steering optics. The delicate and complex nature of the detection optics precludes this type of magneto-optical recording from forming the basis of a viable automotive sensor.

SUMMARY OF THE INVENTION

It is therefore an object of the invention to provide a thermomagnetic method of patterning bulk magnets with magnetic fields readable by a magnetic sensor at a practical spacing and capable of providing a small, low cost magnet with narrow, closely spaced poles. Another object is to provide a method for producing digital patterns as well as analog patterns having gradually varying field strength in bulk magnets. It is another object to provide the bulk magnets made by such a process.

The invention is carried out by a method of imparting a magnetic pattern to a bulk permanent magnet material comprising the steps of: directing energy in a pattern onto base permanent magnet material having a minimum thickness on the order of 1 mm to heat a volume of the material to a threshold temperature to lower the coercivity thereof; imposing a magnetic field on the pattern greater than the coercivity of the heated volume; and allowing the material to cool, whereby the treated pattern has a magnetic characteristic sufficiently different from the base material to be readily detected by a magnetic sensor.

The invention is further carried out by a patterned magnet comprising a magnetized substrate of a permanent magnet material having a minimum thickness on the order of 1 mm and a reverse magnetized pattern extending to a controlled depth from the substrate surface and made by the process of: directing energy onto the magnetized substrate surface in a pattern to heat a volume of the material to lower the coercivity to the controlled depth; imposing a magnetic field on the heated pattern sufficient to reverse the direction of magnetization of the substrate in the heated volume; and cooling the treated pattern.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

In the ensuing description, the term "bulk" is used to distinguish from thin film and very thin film devices. The minimum thickness of a bulk magnet or material is on the order of 1 mm and may be several centimeters thick. Various permanent magnet materials are used as the starting material for the method of the invention. The method has been successfully used on ferrites, alnico materials, and Magnequench (TM) materials, and no magnetic materials have been tried without success. The permanent magnet materials exhibit a critical temperature such that, by heating, local regions can be changed magnetically without affecting the surrounding bulk material. The magnets used in the testing discussed below are saturated, but it is expected that partially magnetized magnets, i.e., not fully saturated, will be useful as well for at least some applications.

For most materials, the process depends on heating to the Curie point to form a volume of paramagnetic material which is then changed in magnetic direction by a field imposed on the volume. There are some magnetic alloys, however, which exhibit a more complicated magnetic behavior as a function of temperature, and heating to a temperature below the Curie point is sufficient to effect a magnetic change. For example, $Nd_2Co_{14}B$ exhibits a spin reorientation phase transition at a temperature $T_s$. Below $T_s$ such materials exhibit an axial easy direction; above $T_s$ the moments will rotate freely in the basal plane. Thus, the Curie temperature need not be reached to apply the patterning process to some materials.

The materials MQ1 and MQ2 are NdFeB-based alloys having a high energy product and are trademarked products of General Motors Corporation. The U.S. Pat. No. 4,792,367 to Lee, assigned to the assignee of this application, discloses the MQ2 material which is a rare earth-iron-boron based alloy that may include other suitable alloying constituents such as cobalt. The preferred methods of forming permanent magnets from that material include overquenching a molten mixture of the precursors by melt spinning to obtain an amorphous or very finely crystalline material having little intrinsic coercivity and then hot pressing to promote crystal growth to the optimum size for the desired hard magnetic properties; alternatively, the material is hot pressed and hot worked to form the desired fine grained recrystallized microstructure consisting mainly of an $Nd_2Fe_{14}B$-type phase. An intrinsic room temperature coercivity exceeding 15 kOe is obtained along with very high remanence and high energy product. MQ1 magnets are made of a powdered form of a similar annealed material held together by epoxy bonding.

Figure 1:
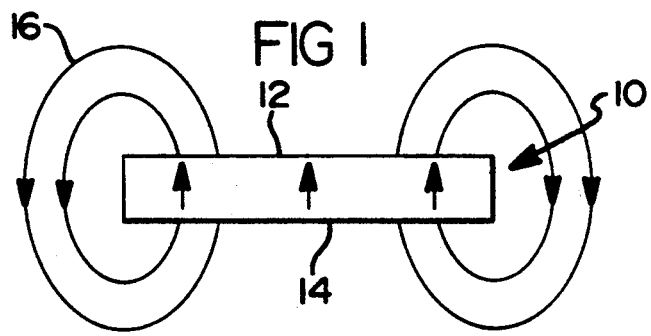
FIG. 1 is a schematic view of a magnet used for patterning by the process according to the invention.
Figure 2:
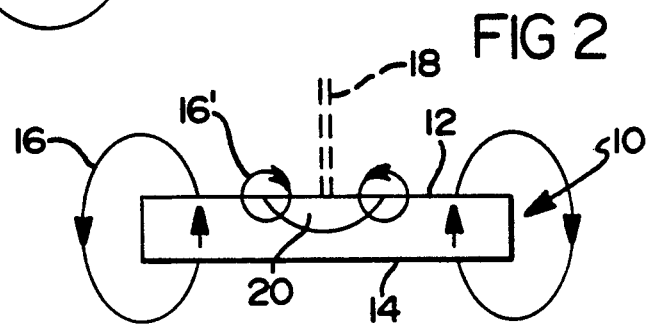
FIG. 2 is a schematic view of the magnet of FIG. 1 being processed according to the invention.

The method of patterning a magnet may be applied to a bulk permanent magnet of any shape, e.g., a plate, a disc or an annulus, magnetized in a direction normal to the surface which is to be patterned. This is exemplified in FIG. 1 as a flat plate magnet 10 having an upper surface 12 and a lower surface 14. The direction of magnetization is normal to the surfaces 12 and 14, and flux lines 16 pass from the upper surface 12 to the lower surface by paths around the edge of the magnet 10. Referring to FIG. 2, a laser beam 18 is then used to create a fine surface pattern of regions in which the magnetization is altered from that of the bulk magnet. These magnetically altered regions are created by localized laser heating of a volume 20 adjacent the surface 12 above the Curie temperature. The volume 20 of material heated above the Curie temperature is in a paramagnetic state and extends to some depth below the surface 12. The flux coming from the magnet surface near a laser heat-affected track finds a path of lower reluctance by looping through the demagnetized volume. Upon cooling below the Curie temperature, the heat-affected volume is once again magnetized, this time in the field 16' of the adjacent, unheated portion of the permanent magnet. Because the field in the heat-affected tracks is small, remagnetization is only partial. The magnetization thereby induced in the heat-affected volume differs in its direction and magnitude from that of the unheated magnetic substrate. This net change in magnetization alters locally the near-surface magnetic field of the heated regions. The end result is a magnet with alternating North and South poles, similar to a conventionally magnetized multipole magnet, but where one of the polarities (that of the unheated region) is normally strong while the other one (that of the heated region) is relatively weak.

Experimental tests employed samples of magnequench and hard ferrite permanent magnets. MQ1 magnets were in the form of flat 1.4 mm thick wafers, and MQ2 magnets were cut from larger blocks of material to various thicknesses varying from 9 mm to 0.9 mm. All these samples were magnetized in a pulsed field oriented normal to their broad faces. The flux density measured at the surface of the MQ1 and MQ2 samples away from their edges varied from about 2.2 to 3 kG. The Curie temperature of Magnequench magnets is about 312° C. The hard ferrite magnet samples were of the sintered $BaO \cdot 6Fe_2O_3$ type. Each sample was 6.2 mm thick and ring-shaped with an inside diameter of 18.5 mm and an outside diameter of 43.5 mm. They were obtained in a magnetized state with a field strength measured away from the edges of the samples of about 550 G. The Curie temperature of the ferrite magnets is about 450° C.

EXAMPLE

A flat, MQ2 magnet measuring about 19 mm×14 mm×9 mm and having a remnant magnetization of about 2.2 kG was scanned by an argon ion laser. A 350 mm focal length lens was used to produce a slightly defocused beam diameter of about 150 μm incident on the surface of the magnet. The laser operated at a power of 6 W measured near the sample. A motorized translation stage was used to move the sample in front of the stationary beam at a rate of 0.33 mm/s (faster scan rates would be desirable and equally effective). In this manner the surface of the sample was covered with a grating of eight laser beam-modified tracks with a spacing of 2 mm between tracks.

Figure 3:
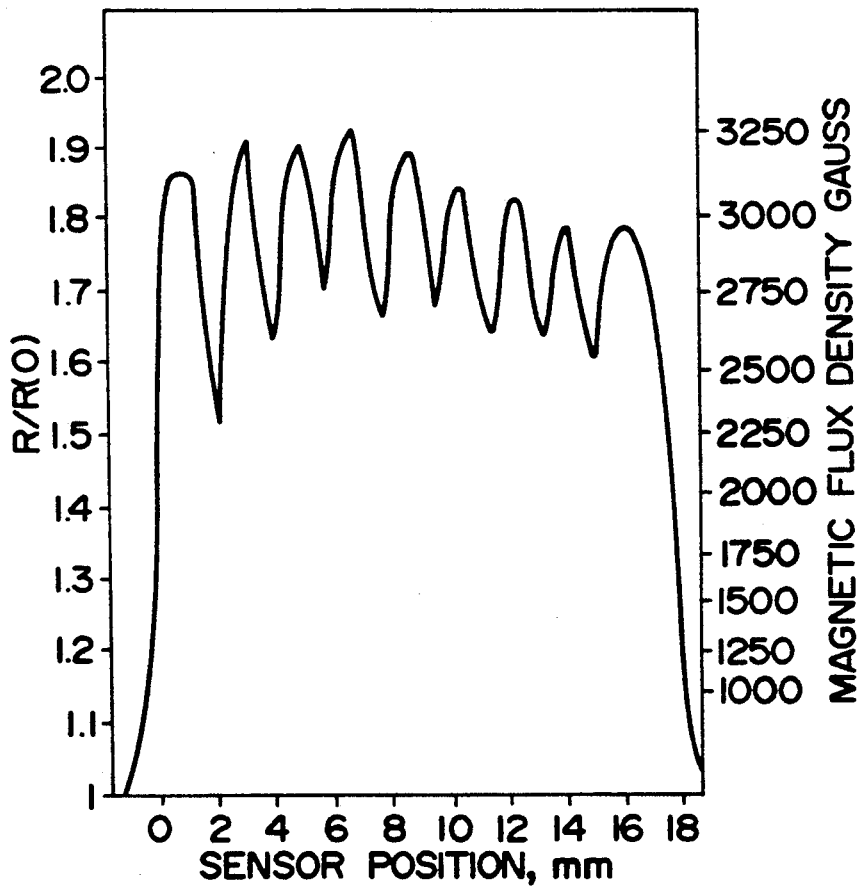
FIG. 3 is a graph of sensor resistance as a function of its position along a patterned magnet according to the invention.

The grating was translated in front of an InSb magnetoresistor at a spacing of 0.1 mm. The ratio R/R(O) of resistance R of the sensor to its zero field resistance R(O) as a function of the sensor's position along the sample is shown in FIG. 3. Each valley in the signal marks the resistance change associated with an individual surface track. The magnetoresistor output corresponds to flux density changes in the range of approximately 500 to 900 G.

Subsequent experiments performed on magnets of various thicknesses and with a narrower spacing between tracks yielded essentially the same results. For a sufficiently thin magnet (about 1 mm or less thick), processed under the conditions given above, the heat-affected zone extends to a depth which is an appreciable fraction of the total sample thickness. In those instances, the grating pattern could be read by the magnetoresistor on both the patterned and unpatterned (i.e., back side) surfaces of the magnets. It was also determined that smoothly polished and surface ground magnets work equally well. Both surfaces of the substrate may be treated with the same pattern to enhance the effect. A technique for achieving this is to simultaneously heat both sides of a thin substrate using a split laser beam to increase the effective depth without broadening the pattern width.

Other combinations of laser and scanning parameters were employed with no fundamental difference in results. In some cases, laser melting and some material removal occurred to produce surface channels, but the magnetoresistor response to such tracks was indistinguishable from that produced by the unmelted tracks. MQ1 samples were particularly susceptible to such melting but yielded equivalent magnetic results. Laser patterning of ferrite ring magnets also produced surface channels and the magnetoresistor output was qualitatively similar to the Magnequench magnets, but the overall signal is smaller due to the initial magnetization of the ferrite samples. Stronger magnetic signal strengths than those reported here are attainable, being only limited by the geometry of the heat-affected zone and the saturation magnetization of the magnet.

Figure 4:
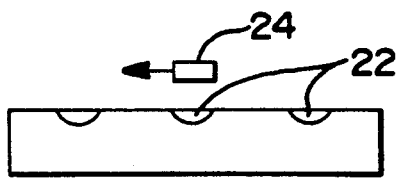
FIG. 4 is a schematic view of a patterned magnet according to the invention and a magnetic field sensor.
Figure 5:
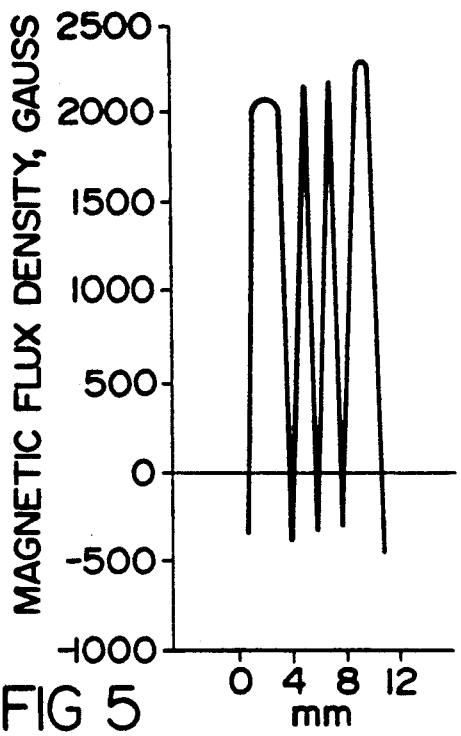
FIGS. 5 and 6 are graphs of magnetic field strength adjacent the patterned magnet of FIG. 4.
Figure 6:
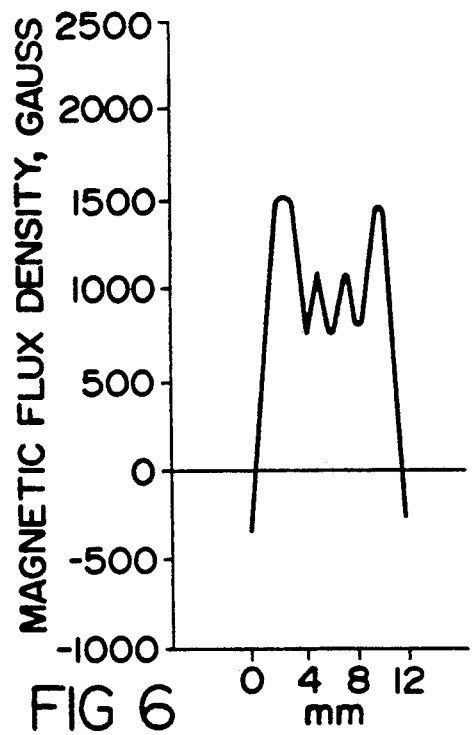

FIG. 4 illustrates a hot pressed MQ2 magnet 10 which is laser patterned with three tracks 22 about 2 mm apart and a Hall-effect device 24 which is movable transverse of the tracks, as indicated by the arrow, to measure the flux density and to sense the direction of flux. FIG. 5 shows the measured flux density for a sensor spacing of 0.25 mm from the surface of the magnet of FIG. 4. The three tracks 22 produce a sharp reduction of the measured field for each track and even reverses the field as shown at positions of 4, 6 and 8 mm. When the sensor is spaced 1 mm from the surface, the reductions of field strength are easily measured and still distinct, as shown in FIG. 6, but the reversal of field direction does not occur that far from the surface. A magnetoresistive sensor can be used instead of the Hall-effect device to sense the variation of field strength, although it is not sensitive to field direction.

The field from the heated tracks can be made stronger by increasing the depth of heating and therefore the remagnetized volume. Another technique for increasing the field strength of the heated tracks is to impose an external magnetic field having a direction counter to the field of the unheated substrate during the heating and cooling process. Then the heated volume can become fully magnetized. The external field should not be so strong as to influence the magnetization of the unheated substrate.

Figure 7:
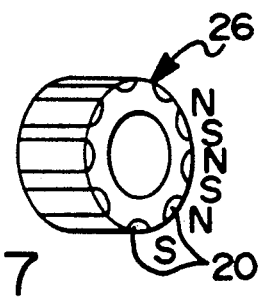
FIG. 7 is an isometric view of a patterned magnet ring according to the invention.

In making patterned magnets by a conventional method, a special magnetizing fixture is made for each type of magnet and the resolution of the magnetic pattern is limited. Patterning magnets by laser processing, however, can be extremely precise, thus allowing a very high density of poles on the surface. A readily attainable density is one pole per mm with each track having a heat affected width of 0.8 mm. With reference to a sensor wheel 26 as shown in FIG. 7, having a plurality of alternating poles and yielding a field having a plurality of strong and weak flux densities, for a given number of poles on the sensor wheel, this laser process will lead to reduced wheel diameter, reduced magnet volume, lower cost and easier packaging. From the manufacturing point of view, the magnetization process is simplified as the magnetizer is required to produce only a unipolar magnet ring with the alternating poles being imprinted afterwards by the laser. In addition, this magnetization process is highly flexible, since the laser beam intensity, trajectory and scan speed can be easily controlled, for example, by computer control. Therefore, the same magnetizing equipment can be used for manufacturing a variety of sensor wheels.

Figure 8:
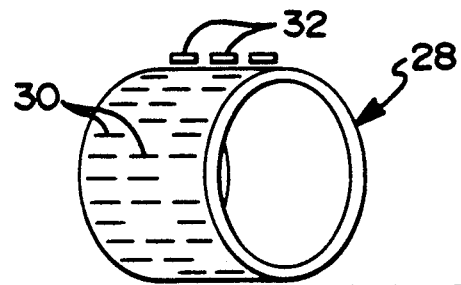
FIG. 8 is an isometric view of a multiple track digitally coded magnet made according to the invention.

Other types of patterned magnets are readily made by the laser process. Instead of making a simple grating on a wheel or plate, heating of the surface could be controlled to produce any desired array of discontinuous line segments or spots, thereby digitally encoding the surface of the magnet, as illustrated in FIG. 8. A code wheel 28 with three tracks of digital code 30 comprising line segments or dots is read by three sensors 32 adjacent the wheel. The laser beam is swept across the wheel in an array of parallel lines and the beam is cut off or interrupted where the imprint is not desired.

Figure 9:
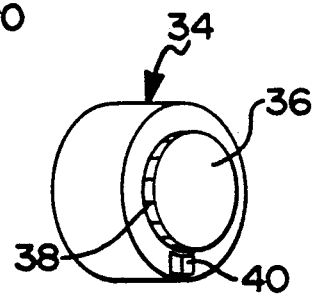
FIG. 9 is an isometric view of an electric motor having an encoded rotor according to the invention.

FIG. 9 shows an electric motor 34 having an exposed permanent magnet armature 36 with laser imprinted code marks 38 on the end or the circumference of the armature, and a sensor 40 adjacent the path of the code marks for reading the code as the armature turns, thus sensing the speed or position of the armature 36. In this case, the armature is already required to be magnetized and the encoding process can be accomplished by laser patterning without any additional magnetizing step.

Figure 10:
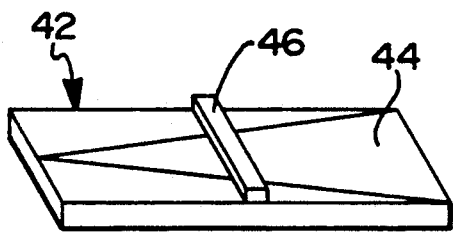
FIGS. 10 and 11 are isometric and cross-sectional views of two embodiments of an analog pattern for a magnet according to the invention.
Figure 11:
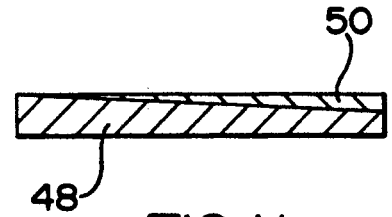

Analog magnet patterns can also be produced by the laser process. As indicated in FIG. 10, a magnet 42 has a V-shaped pattern 44 treated by a laser to yield a flux density which changes gradually along the pattern, becoming weaker as the pattern 44 becomes wider, for sensing by a magnetoresistive sensor 46. The sensor resistance changes as a function of the field strength and thus varies according to the relative position of the magnet and sensor. Upon relative movement of the magnet 42 and sensor 46, the sensor produces a ramp signal. This example is a potentiometer which may be imprinted on a ring magnet for a rotary potentiometer or on a flat plate for a linear potentiometer. The same effect can be obtained, as shown in FIG. 11, by magnet 48 having a laser treated track 50 which gradually changes in depth to yield a gradually changing field along the track.

While it is preferred to heat the tracks with a laser beam, it is considered that other means such as an electron beam or an electric spark heating technique may be used. Surface contact heating is an alternative to pattern heating by an energy beam. This comprises pressing a heated patterned element or "branding iron" against the magnet to locally heat the magnet by conduction.

The embodiments of the invention in which an exclusive property or privilege is claimed are defined as follows:

1. A patterned magnet comprising a magnetized substrate of a permanent magnet material at least one millimeter in thickness and a magnetized pattern extending to a controlled depth from the substrate surface, the patterned region within said substrate having a lower flux density than the original substrate material as detectable by a magnetic sensor; and made by the process of:

directing energy onto the magnetized substrate surface in a pattern to heat a volume of the material to lower the coercivity to the controlled depth;

imposing a magnetic field on the heated pattern wherein the field imposed on the heated pattern emanates at least partially from the magnetized base material, whereby the treated pattern generates a lower flux density than the base material; and cooling the treated pattern in the imposed field.

2. The invention as defined in claim 1 wherein the magnetized pattern comprises an array of parallel stripes having a minimum width of less than 1 mm and a maximum density on the order of one stripe per mm.

3. The invention as defined in claim 1 wherein the pattern comprises a plurality of discontinuous lines, each line being composed of separate magnetic areas arranged to provide a magnetically readable code.

4. The invention as defined in claim 1 wherein the magnet includes a pattern which generates a continuously varying flux density along the pattern.

5. The invention as defined in claim 4 wherein the pattern is elongate and the depth of the pattern gradually increases from one end of the pattern to the other to generate a gradually changing magnetic field along the length of the pattern.

6. The invention as defined in claim 4 wherein the pattern is elongate and the width of the pattern gradually increases from one end of the pattern to the other to generate a gradually changing magnetic field along the length of the pattern.

* * * * *